United States Patent [19]

Esposito

[11] Patent Number: 4,998,335
[45] Date of Patent: Mar. 12, 1991

[54] METHOD OF REPLACING A BOLT IN WORK

[76] Inventor: Gary S. Esposito, 33 Orient La., North Haven, Conn. 06473

[21] Appl. No.: 893,870

[22] Filed: Aug. 6, 1986

Related U.S. Application Data

[63] Continuation-in-part of Ser. No. 697,757, Feb. 4, 1985, abandoned.

[51] Int. Cl.$^5$ ................................................ B23P 6/00
[52] U.S. Cl. ............................... 29/402.06; 29/402.08; 29/426.4
[58] Field of Search ........... 29/402.08, 402.06, 402.19, 29/426.4, 240.5, 240; 411/389, 378

[56] References Cited

U.S. PATENT DOCUMENTS 2,407,904 9/1946 Rosan .................................. 29/426.4
4,376,332 3/1983 Sandifur .......................... 29/402.08

*Primary Examiner*—Howard N. Goldberg
*Assistant Examiner*—Irene Cuda

[57] ABSTRACT

A ruined bolt in work is replaced on removing the same by destroying it on burn-out of its mounting shank from the usual tapped hole in work with ensuing mutilation of the tapped hole, and simply driving a replacement bolt with its self-tapping threaded mounting shank into the multilated hole much in the manner of a tap and thereby securely mounting the new bolt in the work.

5 Claims, 1 Drawing Sheet

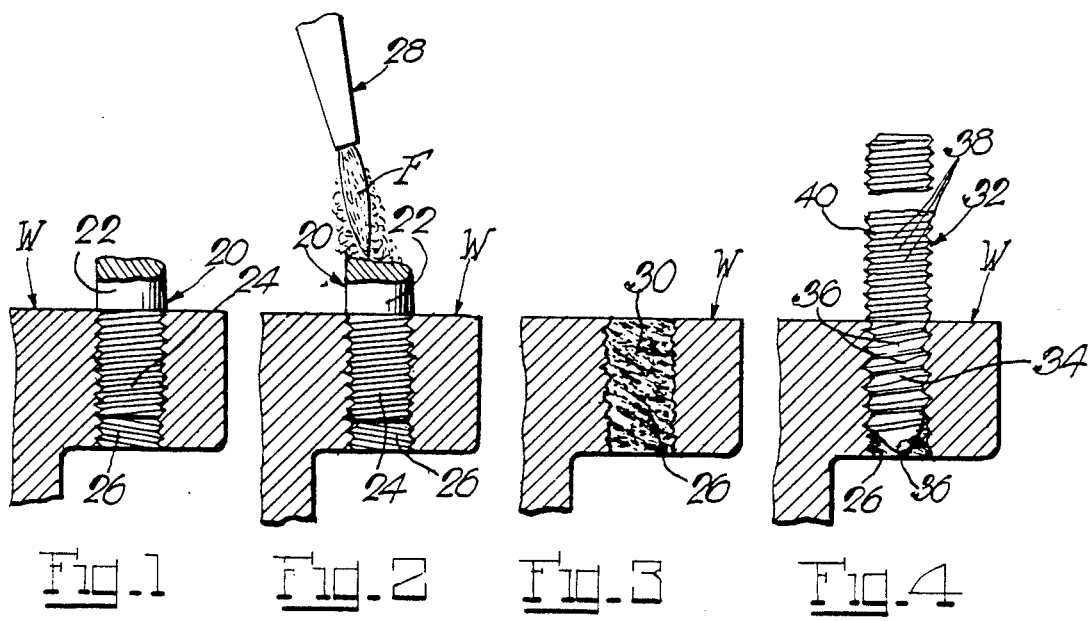
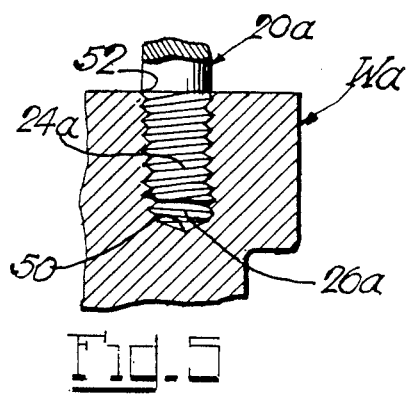

METHOD OF REPLACING A BOLT IN WORK

This application is a continuation-in-part of the co-pending application Ser. No. 697,757, filed Feb. 4, 1985, now abandoned.

This invention refers to machine repair shop practices in general, and to shop practices involving bolt replacement in particular.

Bolt replacement in work is a formidable task even if done by a skilled mechanic under favorable conditions, i. e., on a convenient bench with ready access to a ruined bolt and with all tools for the purpose on hand, and such task becomes increasingly difficult and time-consuming where such a bolt is so tight as to defy all reasonable efforts to unscrew it and laborious drilling must be resorted to for its removal, or where such a bolt is accessible to a mechanic only with difficulty.

Keeping in mind these and still other obstacles to bolt replacement, it is the primary aim and object of the present invention to replace a ruined bolt in work with a new bolt as long as a mechanic can see and reach with either hand, and preferably both hands, the ruined bolt, whereupon the bolt replacement can be achieved by most any mechanic in an exceedingly simple manner which requires little effort and at the most only reasonable skill, and is unfailing to boot. To this end, the invention contemplates a method in which a bolt ruined from any cause, such as a broken or bent stem or a stripped thread, for example, is removed from the work by destroying the same by burn-out with the flame from a handy torch of its mounting shank from the tapped hole in the work in virtually no time and with no more acquired skill on the part of a mechanic to avoid complete burn-out of the hole and instead control the flame so that its effect on the hole leaves the same with some unavoidable mutilation of its internal wall and thread. Such removal of a ruined bolt from the work with some unavoidable mutilation of the internal wall and thread of the hole in the work is not only tolerated, but is in fact of advantage because such mutilation of the hole amounts to a reformation of its threaded wall which has been found effective for mounting a new bolt with a self-tapping mounting shank directly into the hole on simply driving the same with its mounting shank into the hole in the accustomed manner of a tap and thereby mount the bolt as securely as if the hold had been specially tapped just for the new bolt.

It is another important object of the present invention to provide in the the aforementioned method of bolt replacement for driving into the mutilated hole in the work a new bolt the self-tapping mounting shank of which is hardened.

It is still another important object of the present invention to provide in the aformentioned method of bolt replacement for driving new bolts into the mutilated holes in work pieces which are castings.

Further objects and advantages will appear to those skilled in the art from the following, considered in conjunction with the accompanying drawings.

In the accompanying drawings, in which certain modes of carrying out the invention are shown for illustrative purposes:

FIG. 1 is a section through work with a ruined bolt;

FIG. 2 is a section through the work with the ruined bolt shown in the course of its removal from the work in a prominent burn-out step of the featured method of the invention;

FIG. 3 is a section through the work showing the characterisic mounting hole in the work after burn-out of the runied bolt therefrom according to FIG. 2;

FIG. 4 is a section through the work with a bolt replaced in accordance with another prominent step of the featured method of the invention; and FIG. 5 is a section through work which is different from the work in FIG. 1 to 4 and in which is mounted a ruined bolt for replacement by a new bolt in accordance with the featured method of the invention.

Referring to the drawing, the reference character W designates work and more particularly a casting with a bold 20 which is ruined, in this instance by virtue of a broken stem 22 and requires replacement for that reason. In order to remove the ruined bolt from the work (FIG. 1), the threaded mounting shank 24 of the bolt is destroyed by featured burn-out from the tapped hole 26 in the work by flame F from a convenient torch 28 (FIG. 2). With proper adjustment of the flame in length and heat, burn-out of the mounting shank 24 from the hole 26 is achieved, by most any mechanic with no more than ordinary skill, not only in virtually no time, but even more important, with fair localization of the flame on the mounted shank of the ruined bolt which easily avoids intolerable complete burn-out of the hole and, instead, keeps the flame's unavoidable effect on the internal wall and thread of the hole to no more than some mutilation 30 (FIG. 3) which is not at all detrimental but is even advantageous as pointed out earlier. Thus, FIG. 3 shows the hole 26 in its mutilated state 30 after burn-out of the shank of the ruined bolt. After the ruined bolt is thus removed from the work W, and leaving the hole 26 in its mutilated condition, a replacement bolt 32 may quickly be mounted on its tap-like drive with its threaded mounting shank 34 into the mutilated hole 26, with the thread 36 on the mounting shank 34 of the re-placement bolt 32 being of self-tapping type in contrast to the bolt threads 38 on the stem 40 of the replacement bolt which in this instance are the same standard threads as those on the stem 22 of the replaced bolt 20.

Reference is now had to FIG. 5 which shows a ruined bolt 20a in work Wa in which the mounting shank 24a of the bolt is received in a tapped hole 26a which is not a through-hole but has a closed bottom 50. For removal of the bolt 20a from the work by burn-out of its mounting shank 24a from the hole 26a in the work, a mechanic may advantageously invert the work Wa, if possible without any trouble, so as to bring the opening 52 into the hole to the bottom, and by then working the flame from below permitting the residue of the burned-out bolt shank to escape by gravity. However, if such inversion of the work is impossible, or would be too dificult, the mechanic may apply the flame from the top and remove the residue of the burned-out bolt shank with a blast of available compressed air.

The work in which ruined bolts are replaced by the featured method of the invention are castings in which replacement bolts are mounted with their threaded mounting shanks which are hardened for their secure mount in the castings without fail.

The featured method of the invention is particularly unique in that flame from a torch is resorted to not only to remove a ruined bolt from work, but additionally to reform the bolt-mounting hole in the work for the formation of a new thread that mates with the self-tapping thread on the mounting shank of a replacement bolt on simply driving the latter with its mounting shank into the reformed hole.

The featured method of bolt replacement, while generally useful for bolt replacement under any of the aforementioned difficult conditions, is particularly advantageous for use in machine shops such as those dealing with automotive exhause systems, for the replacement of any ruined bolt found in the course of any job such as muffler replacement, at a price which is low in comparison to the average cost of bolt replacement in conventional ways.

The aforementioned reformation of a tapped hole in work by virtue of burn-out of the mounting shank of a ruined bolt therefrom is best demonstrated by the characteristic mutilated condition of the wall and threads thereon of the tapped hole after burn-out of the bolt shank therefrom (FIG. 3) which leaves in the space taken up by the threads in the hole before burn-out of the bolt shank abundant metal for the formation therein of threads which mate with the self-tapping threads on the mounting shank of a replacement bolt on driving the same into the mutilated hole in the work. The wall and threads thereon of the hole in the work are thus reformed by flame mutilation on resorting to a flame with a pointed tip which enable a worker readily to concentrate the flame on the mounted shank of a ruined bolt so as largely to confine mutilation by the flame to the wall and threads thereon of the tapped hole.

What is claimed is:

1. Method of replacing a bolt in a casting, which comprises removing the bolt from the casting by burning out with flame the mounting shank of the bolt from a tapped hole in the casting so as to avoid complete burn-out of the hole and instead keep a flame's effect on an internal wall and thread of the hole to no more than some mutilation and driving a new bolt with its threaded shank tap-like into the mutilated hole for its secure mount therein, with said shank of the new bolt having first threads of self-tapping type thereon, and said new bolt also having a stem with second threads thereon which remains outside said multilated hole, with said second threads being standard threads different from said first threads.

2. Method of replacing a bolt as in claim 1, in which said flame is from a hand torch.

3. Method or replacing a bolt in a casting as in claim 1, in which said new bolt shank and first threads thereon are hardened.

4. Method of replacing a bolt in a casting as in claim 2, in which said flame has a pointed tip for burning out said mounting shank of the bolt from said tapped hole to leave the threads therein mutilated.

5. Method or replacing ruined bolts in castings by a trained worker in a commerical shop, which comprises removing each bolt from its casting in the shop by having the worker direct flame from a torch against the mounting shank of the bolt for its burn-out from the tapped hole in the casting with ensuing mutilation of the tapped hole, and then having the worker drive a new bolt with its threaded shank tap-like into the mutilated hole for its secure mount therein, with said shank of the new bolt having first thresds of sel-tapping type thereon, and said new bolt having also a stem with second threads thereon which reamins outside said mutilated hole, with said second threads being standard threads different from said first threads.

* * * * *